April 16, 1968 H. H. ADELAAR ET AL 3,378,818

DATA PROCESSING SYSTEM

Filed April 22, 1964 3 Sheets-Sheet 1

United States Patent Office 3,378,818

Patented Apr. 16, 1968

3,378,818

DATA PROCESSING SYSTEM

Hans Helmut Adelaar, Ekeren, Jean Louis Masure, Wilrijk, and Pe Tsi Chu, Antwerp, Belgium, assignors to International Standard Electric Corporation, New York, N.Y., a corporation of Delaware Filed Apr. 22, 1964, Ser. No. 361,692
Claims priority, application Netherlands, May 7, 1963, 292,449
23 Claims. (Cl. 340—172.5)

ABSTRACT OF THE DISCLOSURE

A data processing system for controlling an automatic switching system. A plurality of logic circuits, controlled by a wired configuration, are able to perform the more routine switching control operations. The data processor is central to the logic, commonly controlled, and able to perform the more complex non-routine operations. As long as the logic circuits are able to handle the switching requirements of the system, they do so. But, when the operations become too complex, the logic circuits request the processing system to intervene. When it does so, virtually all logic circuits stop their operations while the requesting logic circuit and the processor exchange information.

The present invention relates to a data processing system such as used for controlling an automatic telecommunication switching system, including a plurality of logical circuits which are each able to perform one or more routine operations, and a common control circuit for coordinating said routine operations.

Such a system is already known; however, this known system is controlled by timed pulses which define a repetitive time cycle having $m$ time positions, one per logical circuit, and said common control circuit offers its servive to each logical circuit during the portion of the cycle allocated to this logical circuit.

This means that even when a logical circuit does not need the intervention of the common control circuit, a time position is provided therefor. Generally the time required by such a logical circuit for performing a routine operation is much longer than a time cycle, so that during most of these cycles this logical circuit will not require the intervention of the common control circuit. Hence, a considerable time will be lost. This is also due to the fact that the duration of the time position allocated to a logical circuit must be chosen sufficiently long to enable the longest intervention by the common control circuit to be performed. On the other hand, when a logical circuit needs the intervention of the common control circuit and when this intervention is needed at a moment which is not situated within the allocated time position, this logical circuit will have to wait for an intervention of the common control circuit until the latter presents its service again. Due to this delay it is obvious that information which is only temporarily present in the logical circuit may be lost.

It is therefore an object of the present invention to provide a system of the above type wherein these drawbacks are removed.

The present system is characterized by the fact, that said common control circuit is able to perform non routine or more complex operations and that each of said logical circuits is able to eventually request for an intervention of said common control circuit upon a routine operation having been performed or depending on the result of a routine operation after this operation has been performed.

The above mentioned and other objects and features of the invention will become more apparent and the invention itself will be best understood by referring to the following description of embodiments taken in conjunction with the accompanying drawings in which.

Figure 1:
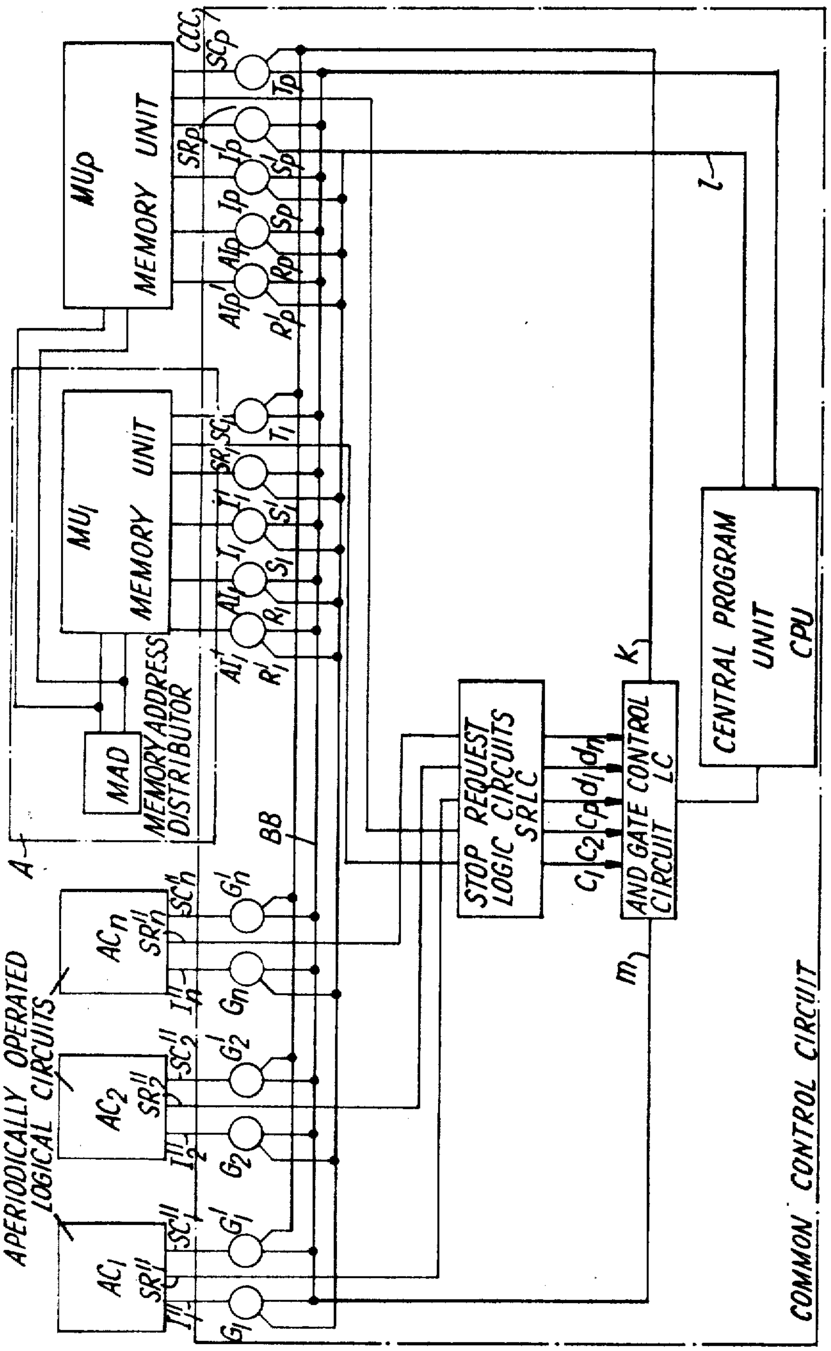
FIG. 1 is a schematic diagram of a system according to the invention.

Referring to FIG. 1, the present telecommunication system includes the logical circuits $MU_1$ to $MU_p$ associated with a common memory address distributor MAD, the logical circuits $AC_1$ to $AC_n$ and a common control circuit CCC. These logical circuits are able to perform one or more routine operations and the common control circuit CCC is able to coordinate these routine operations and to perform non routine or more complex operations.

The logical circuits $AC_1$ to $AC_n$ which are periodically operated each have three output leads, namely an information output lead $I''_1$ to $I''_n$, a stop request output lead $SR''_1$ to $SR''_n$ and a stop condition output lead $SC''_1$ to $SC''_n$. The information output leads $I''_1$ to $I''_n$ are connected to the bus bar BB in the common control circuit CCC via the coincidence gates $G_1$ to $G_n$ respectively, the stop request output leads $SR''_1$ to $SR''_n$ are directly connected to the stop request logical circuit SRLC in this common control circuit CCC and the stop condition output leads $SC''_1$ to $SC''_n$ are connected to the bus bar BB via the coincidence gates $G'_1$ to $G'_n$ respectively. The coincidence gates $G'_1$ to $G'_n$ are controlled by a logical circuit LC via the bus bar $k$ whereas the coincidence gates $G_1$ to $G_n$ are controlled via the bus bar 1 by a central programming unit CPU included in the common control circuit CCC.

Figure 2:
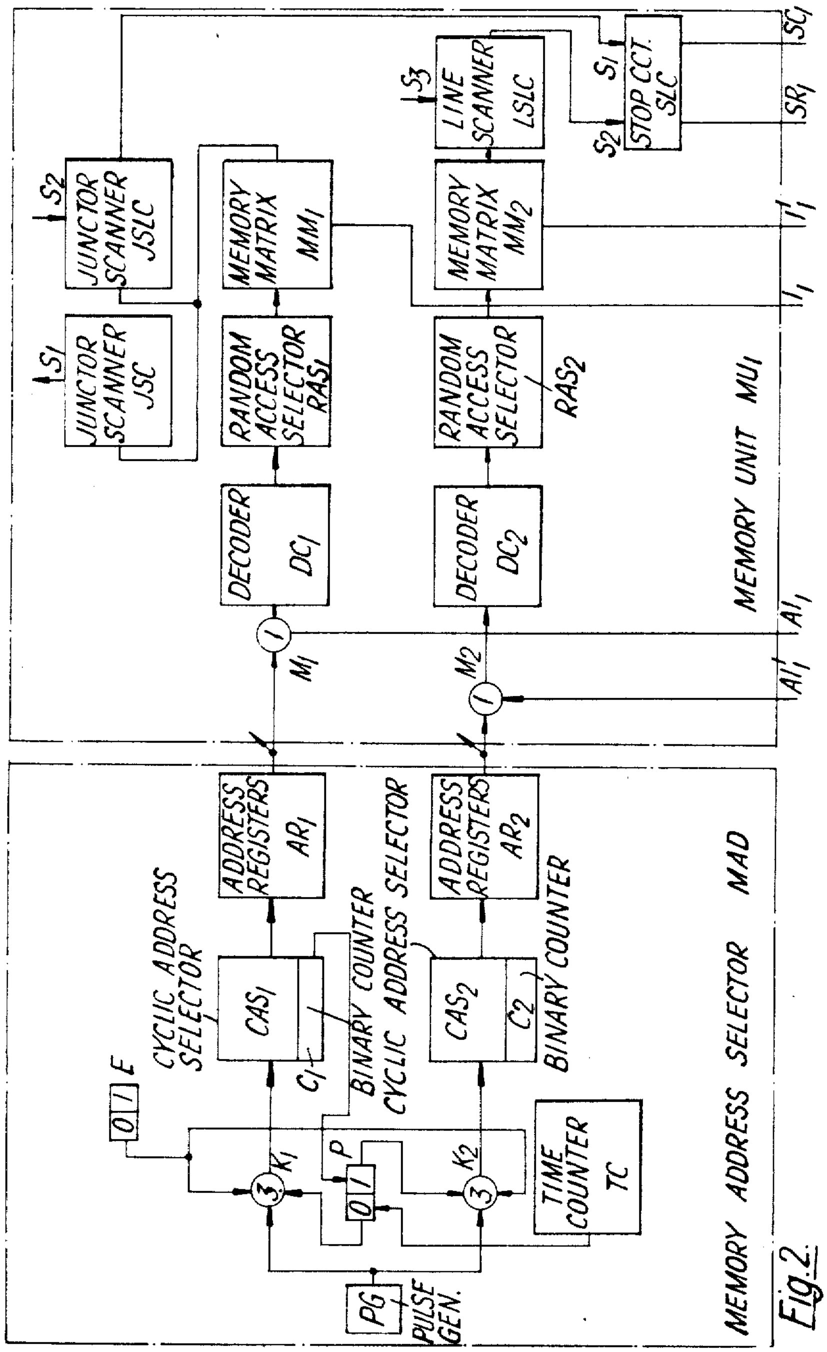
FIG. 2 shows in detail the part indicated by A in FIG. 1.

Referring to FIG. 2, the memory unit $MU_1$ and the memory address distributor MAD represented in FIG. 1 are shown in detail. The memory address distributor MAD comprises a drive current pulse generator PG, the output of which constitutes a first input of the three-input coincidence gates $K_1$ and $K_2$. The second inputs of these gates are constituted by the 0-output and the 1-output of the bistate device P respectively, whereas the third inputs of these gates are constituted by the 0-output of the bistate device E. The output of the gate $K_1$ is connected to the input of a cyclic address selector $CAS_1$ which is of a well known type and which is constituted by an array of gates (not shown) controlled by a binary counter $C_1$, the output of the last stage of which is connected to the 1-input of the bistate device P. The 0-output of the bistate device P is connected to the last stage of a binary time counter TC. The output of the gate $K_2$ is connected to the input of a cyclic address selector $CAS_2$ which is also constituted by an array of gates (not shown) controlled by a binary counter $C_2$. The cyclic address selector $CAS_1$ and $CAS_2$ control the address registers $AR_1$ and $AR_2$ respectively, the outputs of which are connected to the inputs of the memory units $MU_1$ to $MU_p$, as indicated by the multiplying arrow. Hereinafter only the memory unit $MU_1$ is described in detail. The output of the address register $AR_1$ is connected to one input of the two-input mixer $M_1$, the other input of which is connected to the bus bar BB in the common control circuit CCC via the lead $AI_1$ and the coincidence gate $R_1$ (FIG. 1). The output of the address register $AR_2$ is connected to one input of the two-input mixer $M_2$, the other input of which is connected to the above bus bar BB via the lead $AI'_1$ and the coincidence gate $R'_1$ (FIG. 1). The outputs of the mixers $M_1$ and $M_2$ are connected to the inputs of the decoder units $DC_1$ and $DC_2$ respectively, the outputs of which are connected to the random access selectors $RAS_1$ and $RAS_2$ which are of a well known type, such as for instance disclosed in the book "Square-Loop Ferrite Circuitry," by C. J. Quartly and published by Iliffe Books Ltd., London, 1962, page 83. The random access selectors $RAS_1$ and $RAS_2$ each control a two-coordinate memory matrix $MM_1$ and $MM_2$ respectively. An output of the memory matrix $MM_1$ is connected to the junctor scanning circuit JSC and to the junctor scanning logical circuit JSLC, whereas an input thereof is connected to the bus bar BB via the lead $I_1$ and the coincidence gate $S_1$ (FIG. 1). An output of the memory matrix $MM_2$ is connected to the line scanning logical circuit LSLC, whereas an input thereof is connected to the bus bar BB via the lead $I'_1$ and the coincidence gate $S'_1$ (FIG. 1).

The outputs of the junctor scanning logical circuit JSLC and of the line scanning logical circuit LSLC are connected to the input of the stop logical circuit SLC via the leads $S_1$ and $S_2$ respectively. The output lead $SR_1$ of the latter circuit SLC is directly connected to the stop request logical circuit SRLC in the common control circuit CCC, whereas the output lead $SC_1$ is connected to the bus bar BB via the coincidence gate $T_1$ (FIG. 1).

The coincidence gates $R_1$ to $R_p$, $R'_1$ to $R'_p$, $S_1$ to $S_p$ and $S'_1$ to $S'_p$ in the memory units $MU_1$ to $MU_p$ are controlled by the central programming unit CPU (FIG. 1) via the bus bar $l$ whereas the coincidence gates are controlled by the logical circuit LC via the bus bar $k$.

Hereinafter, and although they are able to perform other functions, it is described how the memory units $MU_1$ to $MU_p$ are able to perform call detection and call supervision routine operations.

The memory matrix included in each of the memory units $MU_1$ to $MU_p$ comprises a plurality of words, e.g. 256, each storing all the information relating to a particular call and more particularly the identity of the junctor used for the establishment of this call and also the previous states of the relays included in this junctor and indicating the subscriber loop condition. The memory matrix $MM_2$ included in each of the memory units $MU_1$ to $MU_p$ comprises a plurality of words, e.g. 1000, each storing the line and parking bits of a particular line.

The addresses of the words of the memory matrixes $MM_1$ and $MM_2$ are stored in the address registers $AR_1$ and $AR_2$ respectively. It is supposed that corresponding words in the various memory matrixes $MM_1$ of the memory units $MU_1$ to $MU_p$ have a same address, and that this is also the case with corresponding words in the memory matrixes $MM_2$ of these memory units. Due to this, corresponding words of the memory matrixes $MM_1$ or $MM_2$ may be interrogated in parallel as well during call supervision as during call detection.

The call supervision routine operation is performed in a manner hereinafter described. Supposing the bistable devices P and E being in the condition shown, the drive current pulses supplied by the pulse generator PG are delivered via the gate $K_1$, to the cyclic address distributor $CAS_1$ which cyclically scans the address register $AR_1$. Each address read is supplied via the mixer $M_1$ to the decoder circuit $DC_1$ which then delivers the decoded address in parallel to all the random access selectors $RAS_1$ which read corresponding words in the corresponding memory matrixes $MM_1$. In this manner the identity of a particular junctor and the previous states of the relays thereof are staticized in each memory unit. There they are transferred to the associated junctor scanning circuit JSC and junctor scanning logical circuit JSLC, respectively. Upon receiving the identity of the particular junctor, the junctor scanning circuit PSC scans the present states of the relays of this junctor via the lead $s_1$. The latter states are then transferred to the above junctor scanning logical circuit JSLC via the lead $s_2$ where they are compared with the previous states of the junctor relays already transferred thereto. From the information received the junctor scanning logical circuit JSLC deduces if a modification in the states of the junctor relays has occurred or not. Due to the fact that a word address has been supplied to all the memory matrixes $MM_1$ in parallel such information is simultaneously obtained for $p$ junctors.

When a modification is detected in a memory unit, the output lead $S_1$ of the associated junctor scanning logical circuit JSLC is activated and in response thereto the associated stop logical circuit SLC activates the associated request output lead, $SR_1$ to $SR_n$, which is conected to the common control circuit CCC. In this manner the intervention of the latter circuit is requested for performing more complex operations. The stop logical circuit SLC also registers the so called stop condition, i.e. the reason way the output lead $S_1$ has been activated. This stop condition may be transferred later, when needed, to the common control circuit CCC via the output lead $SC_1$ to $SC_n$ and the associated coincidence gate $T_1$ to $T_n$.

In case no modification has been detected the following word is interrogated in each of the memory matrixes $MM_1$ and a new call supervision routine operation is performed. From the above it follows that, by the stop condition, it is indicated that the described call supervision routine operation has led to the detection of a modification of the condition of a subscriber loop. By the stop request signal, it is indicated that for further treating this modification the common control circuit CCC has to intervene. Such a call supervision routine operation is performed within 20 microseconds. The request for an intervention of the common control circuit CCC by one of the memory units $MU_1$ to $MU_p$ is called a stop request since simultaneously with such an intervention the cyclic scanning operation of the memory matrixes $MM_1$ in the other memory units is stopped. This is necessary in order to enable transfer of information from or towards these memory matrixes $MM_1$ via the leads $I_1$ to $I_n$, $AI_1$ to $AI_n$, the associated coincidence gates $S_1$ to $S_n$, $R_1$ to $R_n$ respectively and the bus bar BB, but also in order that no further intervention requests would be originated by these other memory matrixes. Indeed, such new requests would be lost, unless a special buffer store would be provided for registering these requests. Such a buffer store however complicates the system.

The call detection routine operation is performed in a manner hereinafter described. Supposing the bistable E being in the 0-condition shown and the bistable device P in the 1-condition, the drive current pulses supplied by the pulse generator PG are delivered, via the gate $K_2$, to the cyclic address distributor $CAS_2$ which cyclically scans the address register $AR_2$. Each address read is supplied via the mixer $M_2$ to the decoder circuit $DC_2$ which then delivers the decoded address in parallel to all the random access selectors $RAS_2$ which read corresponding words in the corresponding memory matrixes $MM_2$.

In this manner the line and parking bits of a particular subscriber line are thus staticized in each memory unit. There they are transferred to the associated line scanning logical circuit LSLC. Simultaneously and in synchronism with the scanning of a word in a memory matrix $MM_2$ a line scanner (not shown) scans the loop condition of the corresponding subscriber, this loop condition being also transferred to the line scanning logical circuit LSLC via the lead $s_3$. From the information received, the latter circuit then deduces if the line has made a new call or not. Due to the fact that the word address has been supplied to all the memory matrixes $MM_2$ in parallel the latter information is simultaneously obtained for $p$ lines.

It should be noted that a call detection operation such as described above is known from the article "Outlines of a TDM Two-Wire Telephone Switching System and Its Control," by H. H. Adelaar, F. A. Clemens and J. Masure published in PIEE 1961, volume 108, part B.

In case no new call is detected, the next word in each of the memory units is interrogated, and the above described call detection routine operation is again performed in each of these units.

When a new call is detected in a memory unit, the output lead $S_2$ of the associated line scanning logical circuit LSLC is activated and in response thereto the stop logical circuit SLC activates the associated stop request output lead, $SR_1$ to $SR_n$, which is connected to the common control circuit CCC. In this manner the intervention of the latter circuit is requested for performing more complex operations. The stop logical circuit SLC also registers the so called stop condition or reason why the lead $S_2$ has been activated, i.e. in the present case for a new call. This stop condition may be transferred later, when needed, to the common control circuit CCC via the output lead $SC_1$ to $SC_n$ and the associated coincidence gate $T_1$ to $T_n$.

Summarizing, by the above stop condition it is indicated that the above described call detection operation, which consists in scanning a line and the corresponding word in a memory matrix $MM_2$ and processing the information thus obtained in a line scanning logical circuit LSLC has led to the detection of a new call. By the above stop request signal it is indicated that for further treating this call the common control circuit CCC has to intervene. Such a call detection routine operation is performed within 20 microseconds. It should be noted that the request for an intervention of the common control circuit CCC by one of the memory units $MU_1$ to $MU_p$ is again called a stop request, since simultaneously with such an intervention the cyclic scanning operation of the memory matrixes $MM_2$ in the other memory units has to be stopped for the same reasons as mentioned in relation with the call supervision routine operation. Information may be transferred from or towards these memory matrixes via the leads $I'_1$ to $I'_n$, $AI'_1$ to $AI'_n$, the associated gates $S'_1$ to $S'_n$, $R'_1$ to $R'_n$ and the bus bar BB.

The above aperiodically operated logical circuits $AC_1$ to $AC_n$ are also able to perform routine operations, but these routine operations are supposed to be much longer than those performed by the memory units $MU_1$ to $MU_p$. A marker hunting circuit is able to search for a free path between a subscriber and a free junctor, a marker driving circuit is able to operate switches for establishing this path, etc. Principally referring to FIG. 1, when one of these aperiodically operated circuits $AC_1$ to $AC_n$ has for instance become free or has finished a routine operation and requires new information in order to be able to perform another routine operation, an intervention of the common control circuit CCC has to be requested. This is indicated by the activation of the stop request output lead $SR''_1$ to $SR''_n$ which is connected to the common control circuit CCC. A stop condition, indicating why a stop has been requested, is registered and may be transferred later, when needed, to the common control circuit CCC via the output lead $SC''_1$ to $SC''_n$, the associated gate $G'_1$ to $G'_n$ and the bus bar BB. It should be noted that in case a stop request is granted to one of the aperiodically operated circuits, the cyclic scanning of the memory units $MU_1$ to $MU_p$ is again to be stopped for the same reasons as mentioned in relation with the call supervision and the call detection routine operations. Transfer of information from or towards these aperiodically operated logical circuits $AC_1$ to $AC_n$ may be performed via the leads $I''_1$ to $I''_n$, the gates $G_1$ to $G_n$ respectively and the bus bar BB.

From the above it follows that an aperiodically operated circuit as well as a cyclically operated circuit may request for the intervention of the common control circuit CCC and that the cyclic operation of the memory units is each time stopped when such an intervention is performed.

It has been described how during each call supervision routine operation a junctor scanning circuit JSC scans the states of a number of junctor relays which indicate the loop condition of a particular subscriber line. In order to be able to detect modifications in the condition of this loop due to a subscriber dialling a number, it has been found that reckoning with the dialling speed, this scanning operation has to be performed at least once during a period of 10 to 12 milliseconds, e.g. 10.24 milliseconds. Therefore, the call supervision routine operations on the 256 words in each of the memory matrixes $MM_1$ of the memory units $MU_1$ to $MU_p$ have to be performed at least once during such period. Since, as mentioned above each routine operation takes 20 microseconds, the 256 call supervision routine operations may be performed during 5.12 milliseconds, so that there remains 5.12 milliseconds per period of 10.24 milliseconds for performing other operations, as will be explained hereinafter.

It has also been described above that interventions of the common control circuit CCC may be requested by the memory units $MU_1$ to $MU_p$ in the case of a new call or of a subscriber loop modification or by the aperiodically operated circuits $AC_1$ to $AC_n$. Intervention requests in case of subscribers loop modifications must immediately be granted since the conditions indicating such loop modifications are only temporarily present and therefore require immediate intervention of the common control circuit. The conditions indicating new calls remain present during a relatively long time and the conditions indicating intervention requests from aperiodically operated logical circuits are continuously present and are not so urgent. Therefore the granting of requests in both these cases may be delayed.

Summarizing, in each 10.24 milliseconds period, 256 call supervision routine operations and eventual interventions of the common control circuit CCC upon subscriber loop modifications having been detected must necessarily be performed. The eventual remaining time of each period may be used for performing call detection routine operations and for interventions of the common control circuit upon new calls having been detected or upon requests having been made by aperiodically operated logical circuits. Hence, there exists a problem of determining at any time of the above period of 10.24 milliseconds if the last mentioned operations may be performed or not. This can obviously be done in a number of ways and one possible solution is hereinafter described in detail.

According to this solution the 256 call supervision routine operations are performed at the beginning of each period of 10.24 milliseconds and may eventually be interleaved with interventions by the common control circuit upon requests by the memory units in case of loop modifications or from aperiodically operated circuits. Only when these 256 routine operations have been finished, call detection routine operations are executed eventually interleaved with interventions by the common control circuit upon requests by the memory units in case of new calls or from aperiodically operated circuits. The routine operations of the aperiodically operated circuits are performed during the call supervision and call detection routine operations. The intervention requests from the memory units $MU_1$ to $MU_p$ and from the aperiodically operated logical circuits $AC_1$ to $AC_n$ are granted according to a priority which decreases following the series $MU_1$ to $MU_p$, $AC_1$ to $AC_n$.

Figures 3, 4:
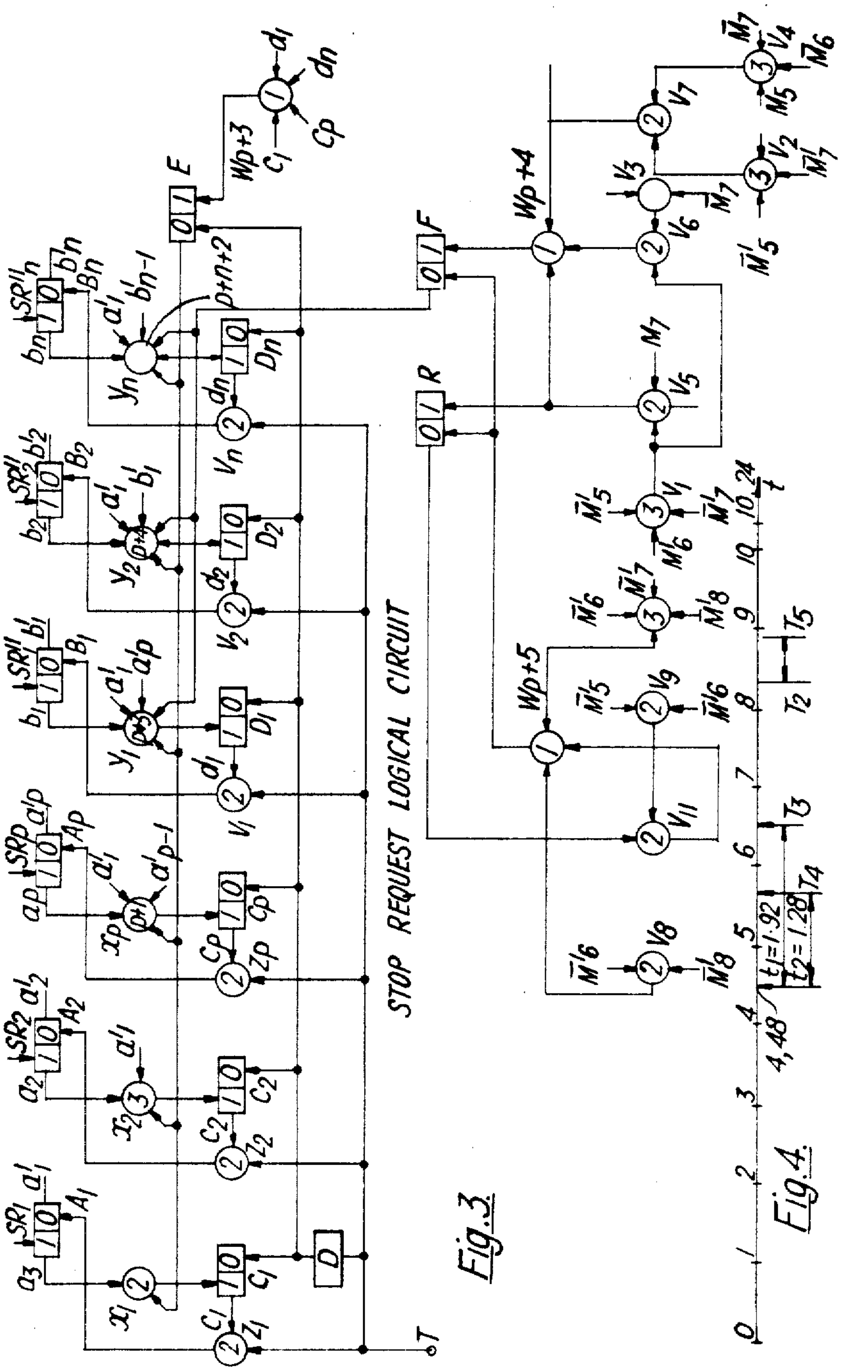
FIG. 3 represents the stop request logical circuit, part of this system.
FIG. 4 is a timing diagram.

Principally referring to FIG. 3, there is shown a stop request logical circuit SRLC for registering the requests from the various circuits and for determining whether requests from these circuits can be granted or not. This stop request logical circuit SRLC comprises a stop request registering circuit, a request granting means and a timing arrangement. The request granting means are itself constituted by a lockout circuit, other registering means and an inhibition circuit.

The output or stop request leads $SR_1$ to $SR_p$ and $SR'_1$ and $SR'_n$ of the logical circuits $MU_1$ to $MU_p$ and $AC_1$ to $AC_n$ respectively are connected to the 1-inputs of the associated bistate devices $A_1$ to $A_p$ and $B_1$ to $B_n$ which constitute the request registering circuit. Hence, also in the series of bistate devices $A_1$ to $A_p$ and $B_1$ to $B_n$ the priority decreases from left to right. The 1-output of each of the bistate devices $A_1$ to $A_p$ constitutes an input of a coincidence gate $X_1$ to $X_p$, another input of which is connected to the 0-output of the bistate device E which is also shown in FIG. 2. The output lead of each coincidence gate $X_1$ to $X_p$ is connected to the 1-input of a bistate device $C_1$ to $C_p$ the 1-output $c_1$ to $c_p$ of which is coupled to the 0-input of the bistate devices $A_1$ to $A_p$ via a two-input coincidence gate $Z_1$ to $Z_p$, the other input of which is connected to an input terminal T. Moreover, each gate $X_2$ to $X_p$ has inputs which are connected to the 0-outputs $a'_1$ to $a'_{p-1}$ of the preceding bistate devices in the series $A_1$ to $A_{p-1}$. For instance, the gate $X_p$ has inputs connected to the 0-outputs $a'_1$ to $a'_{p-1}$ of the bistate devices $A_1$ to $A_{p-1}$.

The 1-outputs $b_1$ to $b_n$ of the bistate devices $B_1$ to $B_n$ are connected to input leads of the coincidence gates $Y_1$, $Y_n$ respectively. An input lead of these gates is further connected to the 0-inputs of the above bistate device E. Moreover, each gate $Y_2$ to $Y_n$ has inputs which are connected to the 0-outputs $a'_1$ to $a'_p$, $b'_1$ to $b'_{n-1}$ of the preceding bistate devices in the series $A_1$ to $A_p$, $B_1$ to $B_{n-1}$. For instance, the gate $Y_2$ has inputs connected to the 0-outputs $a'_1$ to $a'_p$ and $b'_1$ of the bistate devices $A_1$ to $A_p$ and $B_1$. Finally, input leads of the gates $Y_1$ to $Y_n$ are connected to the 0-output of the bistate device F, the 1-input and the 0-input of which are connected to the outputs of the mixers $W_{p+4}$ and $W_{p+5}$ respectively, included in a timing arrangement which will be described later. The output leads of the coincidence gates $Y_1$ to $Y_n$ are connected to the 1-inputs of the bistate devices $D_1$ to $D_n$ respectively. The 1-outputs $d_1$ to $d_n$ of the bistate devices $D_1$ to $D_n$ are coupled to the 0-inputs of the bistate devices $B_1$ to $B_n$ respectively via the two-input coincidence gates $U_1$ to $U_n$, the other inputs of which are connected to the above input terminal T, which is also connected to the 0-inputs of the bistate devices E, $C_1$ to $C_p$ and $D_1$ to $D_n$ via the delay circuit D.

The 1-input of the above bistate device E is connected to the output of a mixer $W_{p+3}$ the inputs of which are connected to the output leads $c_1$ to $c_p$ and $d_1$ to $d_n$ of all the bistate devices $C_1$ to $C_p$ and $D_1$ to $D_n$.

The above lock-out circuit is constituted by the gates $X_1$ to $X_p$ and $Y_1$ to $Y_n$. Indeed, the output of a coincidence gate in the series $X_1$ to $X_p$, $Y_1$ to $Y_n$ cannot be activated when the 1-output of the bistate device $A_1$ to $A_p$, $B_1$ to $B_n$ associated to a lower numbered coincidence gate is activated. The above other registering means are constituted by the bistate devices $C_1$ to $C_p$ and $D_1$ to $D_n$ and the above inhibition circuit is constituted by the bistate device F. The timing arrangement includes the remaining part of FIG. 3 and will further be described in detail.

The operation of the above described part of the stop request logical circuit SRLC will now be described in detail. Hereby it is supposed that all the bistate devices included therein are initially in their 0-condition. When one of the logical circuits $MU_1$ to $MU_p$ or $AC_1$ to $AC_n$, e.g. $MU_p$ which is performing a call supervision or a call detection routine operation, requests for the intervention of the common control circuit CCC by activating its request output lead $SR_p$, the corresponding bistate device $A_p$ is triggered in its 1-condition. Due to this, the corresponding bistate device $C_p$ is also triggered in its 1-condition via the gate $X_p$, thus indicating that the stop request is granted to the memory unit $MU_p$. The gates $Y_1$ to $Y_n$ are all inhibited by the 0-output $a'_p$ of the bistate device $A_p$. These gates and the gates $X_1$ to $X_p$ are also inhibited by the 0-output of the bistate device E which has been triggered in its 1-condition by the 1-output $c_p$ of the bistate device $C_p$ via the mixer $W_{p+3}$. In this manner no other requests can be granted. Also the coincidence gates $K_1$ and $K_2$ (FIG. 2) are inhibited so that the call supervision or call detection routine operation is stopped. It should be noted that in case a request for an intervention is granted to an aperiodically operated circuit, the bistate device E will also be triggered in its 1-condition and the operation of the memory units will be stopped. On the contrary, when a request is granted to a memory unit the operation of the aperiodically operated circuits will not be stopped, so that the latter will continue their routine operation.

From the above it follows that requests from the logical circuits $MU_1$ to $MU_p$ and $AC_1$ to $AC_n$ are granted according to their priority since a request from a particular logical circuit having been registered in one of the bistate devices $A_1$ to $A_p$, $B_1$ to $B_n$, all requests from a logical circuit with a lower priority are prevented from being granted. This request will only be granted when no logical circuit with a higher priority has originated a request.

The bistate device E in its 1-condition indicates that a request has been granted and is being treated by the common control circuit CCC. After the latter circuit has finished its more complex operations, the input terminal T is activated and due to this, the bistate device $A_p$ is triggered back in its 0-condition via the coincidence gate $Z_p$. A small time interval later, determined by the delay circuit D, the bistate devices $C_p$ and E are both also triggered back in their 0-condition and a new routine operation is started.

In the above description, it has been supposed that the bistate device F is in its 0-condition. In this manner a request from an aperiodically operated logical circuit will always be granted on condition that there are no requests from other logical circuits with a higher priority and that the common control circuit is not treating a request, the last condition being indicated by the bistate device E in its 0-condition. Notwithstanding this and as mentioned above, it may happen that an intervention request from an aperiodically operated circuit must be refused for timing reasons, i.e. when otherwise the 256 supervision routine operation could not have been performed within the required interval of 10.24 milliseconds. The timing arrangement which decides for granting the request or not will now be described. It includes the binary counter $C_1$ (FIG. 2) which is of a well known type and which is constituted by eight intercoupled binary stages $M_0$ to $M_7$ (not shown) so that it is able to count 256. As already mentioned above, this binary counter $C_1$ is used for counting the 256 addresses of the cyclic address distributor $CAS_1$ and hence of the 256 words of the various memory matrixes $MM_1$. Next to this word counter the timing arrangement also includes the binary time counter TC (FIG. 2). This counter is also of a well known type and is constituted by nine intercoupled binary stages $M'_0$ to $M'_8$ (not shown). It is stepped each 20 microseconds by pulses delivered by a pulse generator (not shown). This time counter is hence able to count $512\times20$ or 10.24 milliseconds. Principally referring to FIGS. 3 and 4, in order that the 256 call supervision routine operations should be performed within the above time interval of $T=10.24$ milliseconds, the following is done. At the time position $T_1=4.48$ ms. it is checked in what position the word counter $C_1$ has arrived. If the position attained is smaller than 128 it is decided not to grant intervention requests from aperiodically operated logical circuits during 1.92 milliseconds. If the position attained is however situated between 128 and 192 it is decided not to grant intervention requests from aperiodically operated logical circuits during 1.28 milliseconds. Finally, if the position attained is higher than 192 all intervention requests are granted. At the time position $T_2=8.32$ ms. it is again checked in what position the word counter $C_1$ has arrived and if this position is smaller than 228 it is decided not to grant intervention requests from aperiodically operated circuits during 0.64 millisecond. On the contrary when the position attained is higher than 228 such intervention requests are granted.

At the above time position $T_1=4.48$ ms., the time counter TC is in the position 224 i.e. the binary stages $M'_5$, $M'_6$ and $M'_7$ are in their 1-condition. The 1-outputs of these stages are indicated by $\overline{M'_5}$, $\overline{M'_6}$ and $\overline{M'_7}$ and constitute the inputs of the gate $V_1$ the output of which is hence activated at the time position $T_1$ during 20 microseconds. At the time position $T_2=8.32$ ms., the time counter is in the position 416 i.e. the binary stages $M'_5$, $M'_7$ and $M'_8$ are in the 1-condition. The 1-outputs of these binary stages are indicated by $\overline{M'_5}$, $\overline{M'_7}$ and $\overline{M'_8}$ and constitute the inputs of the gate $V_2$, the output of which is hence activated at the time position $T_2$ during 20 microseconds.

When the word counter is in a position between 0 and 128 the binary stage $M_7$, the 0-output of which is indicated by $M_7$, is still in its 0-condition. When the word counter is in a position between 128 and 192, the binary stages $M_6$ and $M_7$ are in their 0-condition and 1-condition respectively. The 0-output of $M_6$, which is indicated by $M_6$, and the 1-output of $M_7$, which is indicated by $\overline{M_7}$, constitute the inputs of the coincidence gate $V_3$. Finally, when the word counter is in a position between 192 and 224, the binary stage $M_5$, is in its 0-condition whereas the binary stages $M_6$ and $M_7$ are in the 1-condition. The 0-output of the binary stage $M_5$ and the 1-outputs of the binary stages $M_6$ and $M_7$ are indicated by $M_5$, $\overline{M_6}$ and $\overline{M_7}$ respectively and constitute the inputs of the coincidence gate $V_4$.

In order to check if at time position $T_1$ the word counter is in a position between 0 and 128, the above output $M_7$ and the output of the above gate $V_1$ are connected to the inputs of a coincidence gate $V_5$ the output of which is connected, on the one hand, to the 1-input of the bistate device F via the mixer $W_{p+4}$ and, on the other hand, to the 1-input of the bistate device R. These bistate devices F and R are hence triggered in their 1-condition when at time position $T_1$ the word counter is not yet in position 128. In order to check if at time position $T_1$ the word counter is in a position between 128 and 192, the outputs of the above gates $V_1$ and $V_3$ are connected to the inputs of a coincidence gate $V_6$, the output of which is connected to the 1-input of the bistate device F via the mixer $W_{p+4}$. This bistate device F is hence triggered in its 1-condition when at the time position $T_1$ the word counter is in a position between 128 and 192. Finally, in order to check if at time position $T_2$ the word counter is in a position between 192 and 224, the outputs of the above gates $V_2$ and $V_4$ are connected to the inputs of a coincidence gate $V_7$, the output of which is connected to the 1-input of the bistate device F via the mixer $W_{p+4}$. This bistate device F is hence triggered in its 1-condition when at the time position $T_2$ the word counter is in a position between 192 and 224.

Summarizing, the bistate device F is brought in its 1-condition first when at the time position $T_1$ the word counter is in a position between 0 and 128, second when at the time position $T_1$ the word counter is in a position between 128 and 192 and finally when at the time position $T_2$ the word counter is in a position between 192 and 224. In all these cases the gates $Y_1$ to $Y_n$ are inhibited by the non-activated 0-output of the bistate device F, so that intervention requests from the aperiodically operated logical circuits $AC_1$ to $AC_n$ will then not be granted.

In the above first case, the requests have only not to be granted during a time interval $t_1=1.92$ ms. and therefore the bistate device F has to be reset in its 0-condition at the time position $T_3=T_1+t_1=4.48+1.92=6.40$ ms. At this moment the time counter is in the position 320 wherein the binary stages $M'_6$ and $M'_8$ are in their 1-condition. The 1-outputs of the latter binary stages which are indicated by $\overline{M'_6}$ and $\overline{M'_8}$ are connected to the inputs of the coincidence gate $V_8$ the output of which is hence activated at the time position $T_3=6.40$ ms. The output of the latter gate $V_8$ is connected to the 0-input of the bistate device F which is hence reset in its 0-condition at the above time position $T_3$.

In the above second case, the requests have only not to be granted during a time interval $t_2=1.28$ ms. and therefore the bistate device F has to be reset in its 0-condition at the time position $$T_4=T_1+t_2=4.48\text{ ms.}+1.28\text{ ms.}=5.76\text{ ms.}$$

At this moment the time counter is in the position 288, wherein the binary stages $M'_5$ and $M'_8$ are in their 1-condition. The 1-outputs of the latter binary stages which are indicated by $\overline{M'_5}$ and $\overline{M'_8}$ are connected to the inputs of a coincidence gate $V_9$, the output of which is hence activated at the time position $T_4=5.76$ ms. The output of the latter gate is connected to the 0-input of the bistate device F via the coincidence gate $V_{11}$ which is controlled by the 0-output of the bistate device R and the mixer $W_{p+50}$.

In this manner, the bistate device F is only reset in its 0-condition at the time position $T_4$, when the bistate device R is in its 0-condition, i.e. when it has been detected, at time position $T_1$, that the word counter C is in a position which is larger than 128. In the case that the latter position is smaller than 128, the bistate device F will be reset in its 0-condition at the moment $T_3$. Indeed, in this case the bistable device R is in its 1-condition and the gate $V_{11}$ is inhibited. At the moment $T_3$ the bistate device R is also reset in its 0-condition.

In the above third case the requests have only not to be granted during a time interval $t_3=0.64$ ms. and therefore the bistate device F has to be reset in its 0-condition at the time position $$T_5=T_2+t_3=8.32\text{ ms.}+0.64\text{ ms.}=8.96\text{ ms.}$$

At this moment the time counter is in the position 448, wherein the binary stages $M'_6$, $M'_7$ and $M'_8$ are in their 1-condition. The 1-outputs of the latter binary stages, which are indicated by $\overline{M'_6}$, $\overline{M'_7}$ and $\overline{M'_8}$ are connected to the inputs of the coincidence gate $V_{10}$, the output of which is hence activated at the time position $T_5=8.96$ ms. The output of the latter gate is connected to the 0-input of the bistate device F which is hence reset at the above time position $T_5$.

At the moment the word counter $C_1$ reaches its 256th or final position, the bistate device P (FIG. 2) is triggered in its 1-condition so that the gates $K_1$ and $K_2$ are inhibited and opened respectively and that the call detection routine operations are automatically started. At the moment the time counter TC has reached its final position, i.e. at the end of each 10.24 ms. period, the bistate device P is reset in its 0-condition so that the gates $K_1$ and $K_2$ are opened and inhibited respectively and that the call detection operations are stopped and the call supervision operations are started.

From the above it follows that in the present system the various logical circuits request themselves for an intervention of the common control circuit, contrary to the system according to the above mentioned Belgian Patent No. 589,466 where this common control circuit regularly presents its service to these logical circuits. The advantages of this new manner of operation are that considerable time is saved since no fixed time positions are allocated to the various logical circuits and that the duration of each intervention is also not fixed but only dependent on the nature of the intervention. Hence the flexibility of the present system is high.

In the above described solution the requests from the memory units $MU_1$ to $MU_p$, either in case of call supervision or call detection, have absolute priority over the requests from the aperiodically operated circuits $AC_1$ to $AC_n$, the latter requests having a priority decreasing from $AC_1$ to $AC_n$ and being only granted when enough time remains in the 10.24 milliseconds period.

This particular solution has only been given by way of example and many other solutions are possible. The only object which has always to be fulfilled is that the 256 call supervision routine operations be performed within the 10.24 milliseconds period. For instance, instead of controlling the gates $X_1$ to $X_p$, $Y_1$ to $Y_n$ in the manner shown in FIG. 3, one could control each of these gates by means of the associated bistate device $A_1$ to $A_p$, $B_1$ to $B_p$ and by one or more inhibition bistate devices, such as F, themselves controlled by a timing arrangement. The latter could for instance operate according to a priority table in order to vary the priority of the various logical circuits, by conditioning the inhibition bistate devices, in dependence on the time position of a request within the above 10.24 ms. period and on the nature of the logical circuit originating such request. For example this system, could operate in such a manner that at time position $t_A$ of the period only the requests of the circuits $AC_1$ and $AC_2$ are granted, but that at time position $t_B$ only the requests of the circuits $AC_1$ and $AC_n$ are granted etc.

Principally referring to FIGS. 1 and 3, when a request has been granted to one of the logical circuits $AC_1$ to $AC_n$ or $MU_1$ to $MU_p$ the identity of this circuit which is registered in the corresponding bistate device $D_1$ to $D_n$ or $C_1$ to $C_p$ is transferred to the logical circuit LC via the output leads $c_1$ to $c_p$, $d_1$ to $d_n$ and registered therein. As soon as this has happened, the logical circuit LC controls the corresponding gate $G'_1$ to $G'_n$, $T_1$ to $T_n$ via the bus bar $k$ in order to transfer the stop condition of the corresponding logical circuit $AC_1$ to $AC_n$, $MU_1$ to $MU_p$ to this logical circuit LC via the bus bar $m$. In this logical circuit LC the above identity and the last mentioned stop condition are processed so as to form input information for a central programming unit CPU which will not be described in detail. This central programming unit CPU is for instance able to control the transfer of information from the logical circuits $AC_1$ to $AC_n$, $MU_1$ to $MU_p$ towards the unit and via the bus bar BB by controlling the gates $G_1$ to $G_n$, $S_1$ to $S_n$, $S'_1$ to $S'_n$, to process the information received from the logical circuit LC and from the logical circuits $AC_1$ to $AC_n$ and $MU_1$ to $MU_p$, and to control the transfer of the information thus obtained towards the latter logical circuits.

In the above described system when a request is originated both the output leads SR and SC are simultaneously activated, the first SR giving the identity of the logical circuit originating this request and the second SC giving the reason for which this request is originated. Since only the output leads SR are coupled to request registering means, the priority of the various requests is only dependent on the identities of the requesting logical circuits and not on the reasons of the requests.

According to another possible solution, the logical circuits may be provided with one or more output leads SR each of which, when activated, gives an indication as well concerning the identity of the requesting logical circuit as concerning the reason why for which a request is originated. By connecting each of these output leads to a request registering means, the priority with which the requests are granted will obviously be dependent as well on the identity of the requesting logical circuit as on the reason of the requests. Since in this case the stop condition is automatically combined with the stop request, no combination is necessary in the logical circuit LC.

While the principles of the invention have been described above in connection with specific apparatus, it is to be clearly understood that this description is made only by way of example and not as a limitation on the scope of the invention.

What is claimed is:

1. Data processing system, such as used for controlling an automatic telecommunication switching system, including a plurality of logical circuits which are each able to perform one or more relatively simple routine operations, a common control circuit means for coordinating said routine operations, means in said common control circuit for performing non-routine relatively complex operations and means associated with said logic circuits and said common control circuit for requesting intervention of said common control circuit when a routine operation is performed or depending on the result of a routine operation, after the routine operation has been performed.

2. Data processing system, in particular automatic telecommunication system, including a plurality of first logical means each for performing at least one first or routine operation and second logical means for performing second or more complex operations, each of said first logical means including a requesting means to request for an intervention of said second logical means upon a first or routine operation having been performed or depending on the result of a routine operation after this operation has been performed.

3. Data processing system as claimed in claim 1, characterized in that said common control circuit includes a request logical circuit comprising a plurality of request registering means each serving for registering a request and request granting means for granting the requests in accordance with the priority with which said common control circuit has to intervene.

4. Data processing system as claimed in claim 2, wherein said second logical means includes a request logical circuit comprising a plurality of request registering means each for registering a request and request granting means for granting the requests in accordance with the priority with which said second logical means has to intervene.

5. Data processing system as claimed in claim 3 wherein said request granting means includes a plurality of gating means each controlled by one of said request registering means, a plurality of other registering means, and a priority arrangement means for controlling said gating means responsive to the requests registered in said request registering means for operating only the one gate with the highest priority which is registered in one of said other registering means.

6. Data processing system as claimed in claim 5, characterized in that said plurality of logical circuits or said plurality of first logical means includes a number of first logical circuits which have each to perform a sequence of $q$ identical routine operations within a predetermined time interval and that said priority arrangement is so arranged and so designed that intervention requests from said first logical circuits have absolute priority over the intervention requests from the remaining or second of said plurality of logical circuits or first logical means.

7. Data processing system as claimed in claim 6, characterized in that each of said first logical circuits includes a register with $q$ words an an auxiliary logical circuit, each of said routine operations consisting in interrogating one of said words and in processing the thus obtained information in said auxiliary logical circuit.

8. Data processing system as claimed in claim 7, characterized in that it includes stopping means for stopping said sequence of $q$ routine operations of said first logical circuits during an intervention of said common control circuit.

9. Data processing system as claimed in claim 8, characterized in that said priority arrangement is constituted by a plurality of inhibition means each controlling one or more of said gating means and by a timing arrangement controlling said inhibition means in such a manner that one or more, of said inhibition means are operated during distinct time intervals thus inhibiting the controlled gating means and preventing corresponding requests from being registered in said other registering means.

10. Data processing system as claimed in claim 9, characterized in that said timing arrangement includes a first counter for counting said $q$ routine operations, a second counter for counting said predetermined time interval, and checking means for checking at various positions of said second counter the position of said first counter in order to operate or not one or more of said inhibition means during said distinct time intervals.

11. Data processing system as claimed in claim 10, wherein said plurality of gating means are arranged so as to constitute a lock-out circuit, means responsive to a request registered in one of said plurality of request registering means for inhibiting all gating means associated with higher numbered request registering means, and means whereby the request is registered in the associated other request registering means, if the associated gating means is itself not inhibited by a request registered in a lower numbered request registering means or by one of said inhibition means.

12. Data processing system as claimed in claim 11, characterized in that said request registering means are constituted by first ($A_1$ to $A_p$) and second ($B_1$ to $B_n$) bistate devices, that each first bistate device has its 1-input coupled to an associated first logical circuit $MU_1$ to $MU_p$ whereas each second bistate device has its 1-input coupled to an associated second logical circuit ($AC_1$ to $AC_n$) so that a first or second bistate device is brought in its 1-condition when the associated first or second circuit originates a request, that said lock-out circuit is constituted by a plurality of first ($X_1$ to $V_p$) and second ($Y_1$ to $Y_n$) coincidence gates which are each connected to the 1-output of a corresponding first ($A_1$ to $A_p$) and second ($B_1$ to $B_n$) bistate device respectively other inputs of each first said second coincidence gate being connected to the 0-inputs of all the preceding first and second bistate devices and that each of said other registering means is constituted by a third bistate device ($C_1$ to $C_p$, $D_1$ to $D_n$) having its 1-input coupled to the output of a corresponding first or second coincidence gate.

13. Data processing system as claimed in claim 12, characterized in that it includes a single inhibition circuit which is constituted by a fourth bistate device (F) the 0-output of which is connected to an input of said second coincidence gates ($Y_1$ to $Y_n$) and the 1-input of which is connected to the output of said timing arrangement.

14. Data processing system as claimed in claim 13, characterized in that said first counter has associated to it a number of $s$ third concidence gates ($M_7$, $V_3$, $V_4$) the output of each of which is activated as long as said first counter is in a position between two predetermined positions, that said second counter has associated to it a number of $r \leq s$ fourth coincidence gates ($V_1$, $V_2$) the output of each of which is activated when said second counter is in one of $r$ predetermined positions indicating $r$ predetermined first time positions ($T_1$, $T_2$), that the outputs of said $s$ third coincidence gates are each connected to an input of a fifth coincidence gate, ($V_5$, $V_6$, $V_7$) another input of which is connected to one of the outputs of said $r$ fourth coincidence gates and that the output of each of said fifth coincidence gates is connected to the 1-input of said fourth bistate device (F) via a first mixer ($W_{p+4}$).

15. Data processing system as claimed in claim 14, characterized in that said second counter has associated to it a number of $s$ sixth coincidence gates ($V_8$, $V_9$, $V_{10}$) the output of each of which is activated as long as said second counter is in one of $s$ predetermined positions indicating $s$ predetermined other time positions ($T_3$, $T_4$, $T_5$) and that the outputs of said $s$ sixth coincidence gates are connected to the 0-input of said fourth bistate device via a second mixer ($W_{p+5}$).

16. Data processing system as claimed in claim 15, characterized in that an input of each of said first and second coincidence gates is connected to the 0-output of a fifth bistate device (E) the 1-input of which is connected to the output of a third mixer ($W_{p+3}$), the inputs of which are connected to the 1-outputs of all said third bistate devices.

17. Data processing system as claimed in claim 16, characterized in that it includes means for activating a terminal (T) each time said common control circuit has finished its intervention, that said terminal is coupled to the 0-input of each of said first and second bistate devices via a seventh coincidence gate ($Z_1$ to $Z_p$, $U_1$ to $U_n$), another input of which is connected to the 1-output of the corresponding third bistate device, and that said terminal is further coupled to the 0-inputs of said third bistate devices and of said fifth bistate device via a delay circuit (D).

18. Data processing system as claimed in claim 16, characterized in that the sequence of said $q$ routine operations is controlled by a pulse generator (PG) which is coupled to said first logical circuits via an eighth coincidence gate ($K_1$) the inputs of which are connected to the 0-output of said fifth bistate device (E) and to the 0-output of a sixth bistate device (P) respectively, and that the 1- and 0-inputs of said sixth bistate device are connected to the output of the final stages of said first ($C_1$) and of said second counter (TC) respectively.

19. Data processing system as claimed in claim 3 characterized in that each of said logical circuits or first logical means has one or more first outputs each of which is activated upon a request being originated by the associated logical circuit or first logical means and each of which is coupled to one of said request registering means, and that an activated first output gives an indication concerning as well the identity of the logical circuit or first logical means originating the request as concerning the reason for which this request is originated.

20. Data processing system as claimed in claim 3, characterized in that each of said logical circuits or first logical means has one second output (SR) which is activated upon a request being originated by the associated logical circuit or first logical means and which then indicates the identity of this logical circuit or first logical means said second output being coupled to one of said request registering means and that each of said logical circuits or first logical means has one or more third outputs (SC) which are activated simultaneously with said second output upon a request being originated by the associated logical circuit or first logical means and for a distinct reason for which this request is originated.

21. Data processing system as claimed in claim 19 characterized in that when a request is granted the identity of the requesting logical circuit or first logical means as well as the reason for which this request has been granted are transferred to a processing circuit (LC) wherein this information is processed so as to form input information for a programming unit (CPU) which delivers output information to control said logical circuits or first logical means.

22. Automatic telecommunication switching system including a data processing system as claimed in claim 7, and means for establishing a connection between a calling and a called subscriber via switching means and a junctor, means whereby each of said $q$ words stores information relating to a connection between a calling and a called subscriber and more particularly information relating to the identity of a junctor and the subscriber loop condition indicated by the conditions of said junctor used in the establishment of a connection between a calling and a called subscriber, and means whereby each of said $q$ routine operations is to detect modifications in said subscriber loop condition.

23. Automatic telecommunication system as claimed in claim 22, characterized in that said auxiliary logical circuit comprises a junctor scanner (JSC), a junctor scanning logical circuit (JSLC) and a logical means (SLC), that in interrogating one of said $q$ words the identity of a junctor and the previous loop condition of a particular subscriber are obtained and transferred to said junctor scanner and said junctor scanner logical circuit respectively, that said junctor scanner checks the present loop condition of said particular subscriber and transfers it to said junctor scanning logical circuit wherein it is compared with the previous loop condition already transferred thereto, and that upon a modification being detected an output signal is transmitted to said logical means in order to indicate this modified loop condition and to request for an intervention of said common control circuit.

References Cited

UNITED STATES PATENTS

| | | | |
|---|---|---|---|
| 2,876,288 | 3/1959 | Brooks | 179—18 |
| 3,029,414 | 4/1962 | Schrimpf | 340—172.5 |

ROBERT C. BAILEY, *Primary Examiner.*

R. B. ZACHE, *Assistant Examiner.*